Patented Feb. 28, 1939

2,148,910

UNITED STATES PATENT OFFICE 2,148,910

AZO COMPOUNDS

Fritz Mietzsch and Josef Klarer, Wuppertal-Elberfeld, Germany, assignors to Winthrop Chemical Company, Inc., New York, N. Y., a corporation of New York No Drawing. Application January 29, 1937, Serial No. 122,982. In Germany April 18, 1934

10 Claims. (Cl. 260—155)

This invention relates to azo compounds which display a bactericidal action, and to a process of preparing the same.

U. S. application for Letters Patent Serial No. 702,427, filed Dec. 14, 1933, and application for Letters Patent Serial No. 33,415, filed July 26, 1935, refer to the manufacture of azo compounds displaying a bactericidal action, which azo compounds have the general formula: $R^1-N=N-R^2$ wherein $R^1$ stands for a para-sulfamide or disulfamide substituted phenyl radical, and $R^2$ stands for a cyclic radical containing nitrogen in basic linkage, that is for an aminobenzene, aminonaphthalene, pyridine, quinoline or isoquinoline radical which contains at least one further basic nitrogen atom in the form of an amino or alkylamino group. It is stated in the said specification that acid groups should not be present in the said azo compounds since it has been established that the bactericidal activity of the azo compounds specified is reduced to a far-reaching extent by the presence of acid groups. For instance, the 2.4-diaminoazobenzene-4'-sulfonic acid amide becomes inactive by the introduction of a carboxylic acid group in the 2'-position. This behaviour of the said azo compounds was disadvantageous in so far as a greater solubility of the said azo compounds was desired for their parenteral administration, since the introduction of acid groups is known as a medium which is suitable to effect a greater solubility of a chemical compound. For the above-mentioned reason first it appeared necessary in the present case to take other ways in order to effect an increase of the solubility of the azo compounds specified above. However, we have made the surprising discovery that the introduction of acid groups into the azo compounds mentioned does not in every case reduce their bactericidal activity. Rather, products of increased solubility and maintained bactericidal activity are obtained if acid groups are introduced into that radical of the azo compounds which contains the basic nitrogen atoms. The cyclic radical containing the acid group and the basic nitrogen atoms, but only this radical, may also contain a hydroxyl group instead of one basic nitrogen atom. Regarding the activity and solubility it is immaterial whether the free acid group is present in the form of nucleo-bound sulfonic or carboxylic groups, or whether these groups are bound by means of intermediate members, for instance, also aminomethane sulfonic acid, aminoacetic, hydroxy acetic, aminoethane sulfonic acid and other radicals may be introduced to effect an increased solubility. The amino or hydroxyl groups which are characteristic substituents of the one radical attached to the azo group may serve as intermediate members. Accordingly, new products which display a considerable bactericidal activity and a good solubility in water are obtainable by the manufacture of azo compounds of the formula: $R^1-N=N-R^2$ wherein $R^1$ stands for a cyclic radical selected from the group consisting of para-sulfamide and disulfamide substituted phenyl radicals, in which radical the amino group of the sulfamide groups may be substituted by alkyl groups or an alkylene group, and wherein $R^2$ stands for a cyclic radical containing nitrogen selected from the group consisting of pyridine and quinoline radicals, which radicals contain at least one further basic nitrogen atom in the form of an amino- or alkylamino group or contain at least one hydroxyl group, and further contain at least one acid group which may be a substituent of the amino or hydroxyl group. In these compounds the amino group attached to the sulfonic acid group(s) may be a primary, secondary or tertiary amido group. It may be substituted by alkyl groups, such as methyl, ethyl, propyl and butyl, or by an alkylene group, such as the tetramethylene and pentamethylene group, in which case the amido group forms a pyrrolidyl or piperidyl nucleus. However, it may be expressly stated that hydroxyalkyl groups should not be present since they strongly reduce the bactericidal activity contrary to the other substituents. The benzene radical bearing the sulfonic acid amide group(s) may contain further substituents, for instance, alkyl groups, such as methyl and ethyl, but free acid groups should not be present in this radical.

The amino group which is present in the other radical attached to the azo group may be substituted by alkyl groups, such as methyl, ethyl and butyl groups, by acyl groups, such as acetyl without the bactericidal activity of the azo compounds being substantially affected. Correspondingly the term "amino" when used in the appended claims is intended to include also such substituted amino groups.

The free acid group which is preferably a sulfonic acid or carboxylic acid group may be present once or several times. In view of the presence of the acid groups the new azo compounds are capable of forming salts with bases, such as the alkali and alkaline-earth metal bases, for instance, calcium-, strontium-, magnesium-, sodium-, potassium- and lithium-hydroxide or carbonate, or with ammonia or amine bases, such as diethylamine, dihydroxyethylamine, ethylenediamine, diethylaminoethanol, piperidine and piperazine.

In accordance with the present invention the new azo compounds specified above are obtainable by reacting upon a cyclic nitrogenous compound selected from the group consisting of pyridine and quinoline compounds which contain at least one further nitrogen atom in the form of an amino or alkylamino group or at least one hydroxyl group, and further contain at least one acid group which may be a substituent of the amino or hydroxyl group, with a diazo compound selected from the group consisting of parasulfamide and disulfamide substituted diazo compounds of the benzene series in which the amino group of the sulfamide group may be substituted by alkyl groups or by an alkylene group. The reaction is advantageously carried out in the presence of water at a low temperature, say at about 20° C. or below.

The azo compounds thus obtainable are colored powders which in the form of their alkali or alkaline-earth metal-, ammonium or amine salts in general are soluble in water. In view of their considerable bactericidal activity they have proved active in the treatment of infectious diseases. The invention is further illustrated by the following examples without being restricted thereto:

*Example 1.*—20.8 grams of the hydrochloride of 4-aminobenzene sulfonic acid amide are dissolved in 15 ccs. of concentrated hydrochloric acid and water and diazotized with a concentrated aqueous solutions of 6.9 grams of sodium nitrite at 0° to 5° C. The solution is mixed with an acetic acid solution of 27.1 grams of 2.6-diaminopyridine-disulfonic acid (prepared by heating 2.6-diamino-pyridine in 20% fuming sulfuric acid with the addition of vanadylsulfate). After the addition of sodium acetate and after prolonged stirring the azo compound of the formula

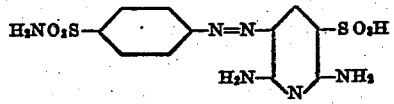

precipitates as a yellow precipitate which is filtered with suction and dissolved in dilute caustic soda solution. From the intensely yellow colored alkaline solution the azo compound is precipitated by means of acids.

*Example 2.*—26 grams of the sodium salt of 6-aminoquinoline-N-methane sulfonic acid (yellow, readily water-soluble powder, obtained by heating 6-aminoquinoline with sodium formaldehyde bisulfite) are added to the diazo solution from 20.8 grams of the hydrochloride of 4-aminobenzene-sulfonic acid amide which has been neutralized with sodium bicarbonate. From the intensely orange colored solution to which alcohol has been added the readily water-soluble yellow red sodium salt of the azo compound of the formula

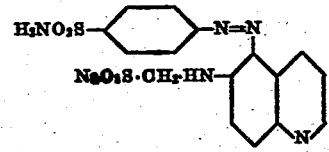

precipitates.

The sodium salt of 6-aminoquinoline-N-methane-sulfonic acid may be replaced by 24.4 grams of the sodium salt of 6-aminoquinoline-N-methane-sulfinic acid (yellow powder which is readily soluble in water prepared by heating 6-aminoquinoline with sodium formaldehyde sulfoxylate) a deep yellow, readily water-soluble azo compound being obtained;

Or by 20.4 grams of quinoline-6-amino-acetic acid (prepared by heating 6-aminoquinoline with chloroacetic acid). A vermilion red azo compound is obtained which is insoluble in water as free acid. In sodium carbonate solution it turns to dark orange. By means of sodium chloride the sodium salt may be obtained in red needles.

*Example 3.*—20 grams of 4-aminobenzene-sulfonic acid monoethylamide are dissolved in 30 ccs. of concentrated hydrochloric acid and 100 ccs. of water and diazotized with 8.5 grams of potassium nitrite. The diazo solution is then added to a solution of 18.9 grams of 8-hydroxyquinoline-7-carboxylic acid in potassium carbonate solution. The potassium salt of the 8-hydroxyquinoline-7-carboxylic acid-azophenyl-4'-sulfonic acid-ethylamide of the formula 655/A^II

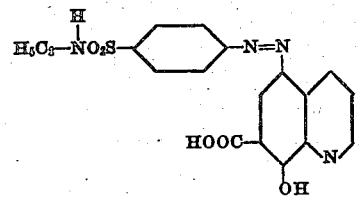

formed is obtained from the deep yellow red solution by salting out with potassium chloride in the form of a red brown powder. The free carboxylic acid is obtained by acidifying the yellow red solution by means of hydrochloric acid in the form of a yellow brown powder which is difficultly soluble in water. After isolation it may be transformed into its calcium,- magnesium,- lithium-, or ammonium salt by treatment with the corresponding hydroxides.

Instead of the 4-aminobenzene sulfonic acid-monoethylamide the 2-methyl-4-aminobenzene sulfonic acid amide may be used.

*Example 4.*—17.2 grams of 4-aminobenzene sulfonic acid amide are dissolved in 25 ccs. of concentrated hydrochloric acid and water and diazotized with an aqueous solution of 6.9 grams of sodium nitrite at 0° to 5° C. The diazo solution is added to a solution of 22.5 grams of 8-hydroxyquinoline-5-sulfonic acid in 400 ccs. of 10% sodium carbonate solution. After coupling is complete the mixture is acidified with dilute acetic acid. Thereby the 4'-sulfonamide-phenyl-azo-8-hydroxyquinoline-5-sulfonic acid of the formula

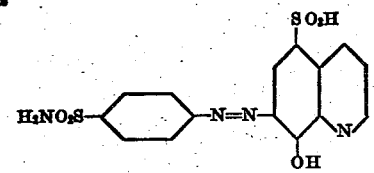

precipitates in the form of a brown red crystal powder which is difficultly soluble in water. In dilute caustic soda solution and sodium carbonate solution it is taken up with a yellowish-red, in dilute hydrochloric acid with rose-red coloration.

*Example 5.*—17.2 grams of 4-aminobenzene sulfonic acid amide are diazotized as described above and mixed with a solution of 19.0 grams of 4-hydroxy-6-aminoquinoline-2-carboxylic acid (yellow crystals melting above 300° C. which dissolve in sodium carbonate solution and hydrochloric acid) in 400 ccs. of 10% sodium carbonate solution. On acidification with acetic acid the 4'- sulfonic acid amide-phenylazo-4-hydroxy-6-aminoquinoline-2-carboxylic acid of the formula

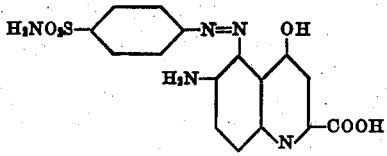

precipitates as brownish-red crystal powder which is soluble in caustic soda solution and sodium carbonate solution with brownish red coloration. In dilute hydrochloric acid it is only slightly soluble.

In an analogous manner there may be obtained from 18.9 grams of 8-hydroxyquinoline-7-carboxylic acid or from 21.8 grams of 8-aminoquinoline-6-hydroxy-acetic acid (obtained by reaction of 6-hydroxy-8-nitroquinoline with chloro-acetic acid and reduction of the nitro compound) the 4'-sulfonic acidamide-phenylazo-8-hydroxyquinoline-7-carboxylic acid or the 4'-sulfonic acid-amide-phenylazo-8-aminoquinoline-6-hydroxy-acetic acid as a brownish red crystal powder melting above 300° C.

*Example 6.*—22.8 grams of 4-aminobenzenesulfonic acid monobutylamide melting at 100° C. are dissolved in 25 ccs. of concentrated hydrochloric acid and water and diazotized with 6.9 grams of sodium nitrite. On coupling with a solution of 22.5 grams of 8-hydroxyquinoline-5-sulfonic acid in 400 ccs., if 10% sodium carbonate solution the 4'-sulfonic acid-butylamide-phenylazo-8-hydroxyquinoline-5-sulfonic acid of the formula

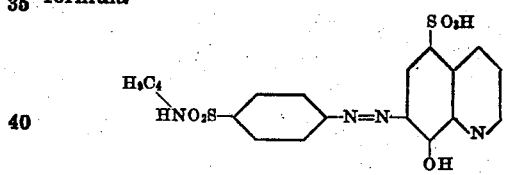

is obtained in brown red crystals melting above 300° C. Similar azo compounds are obtained with 20.0 grams of 4-aminobenzene sulfonic acid dimethylamide melting at 168° C., or with 24.0 grams of 4-aminobenzene sulfonic acid piperidide melting at 164° C., or with 30.7 grams of aminobenzene-3.5-bis (sulfonic acid dimethylamide) melting at 183° C. The latter has the formula

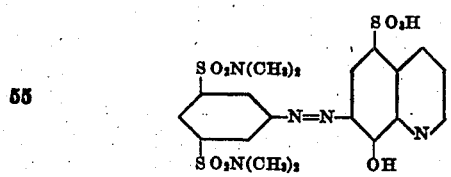

This is a continuation in part of our copending application for Letters Patent Serial No. 15,696, filed April 10, 1935.

We claim:

1. Azo compounds of the general formula:  $R^1-N=N-R^2$ wherein $R^1$ stands for a cyclic radical selected from the group consisting of phenyl radicals containing a sulfamide group in the para-position to the azo group and of disulfamide substituted phenyl radicals and of the corresponding N- lower hydrocarbon alkyl and N-alkylene substituted products, both free valences of the alkylene radical being attached to the nitrogen atom, which radicals are free from other substituents, and wherein $R^2$ stands for a cyclic radical containing nitrogen selected from the group consisting of pyridine and quinoline radicals, a nuclear carbon atom of which radical is directly connected with the azo group and which radical contains at least one further substituent selected from the group consisting of amino, lower hydrocarbon alkylamino and hydroxyl groups and further contains at least one acid radical which is bound to the cyclic radical by a member selected from the group consisting of nuclear carbon atoms, oxygen atoms and amino groups, which azo compounds are in the form of their alkali and alkaline-earth metal-, ammonium- and amine salts in general soluble in water.

2. Azo compounds of the formula:

$$R^1-N=N-R^2$$

wherein $R^1$ stands for a phenyl radical which contains a sulfamide group in the para-position to the azo group and is free from other substituents, and wherein $R^2$ stands for a cyclic radical containing nitrogen selected from the group consisting of pyridine and quinoline radicals, a nuclear carbon atom of which radical is directly connected with the azo group and which radical contains at least one further substituent selected from the group consisting of amino, lower hydrocarbon alkylamino and hydroxyl groups and further contains at least one acid radical which is bound to the cyclic radical by a member selected from the group consisting of nuclear carbon atoms, oxygen atoms and amino groups, which azo compounds are in the form of their alkali and alkaline-earth metal-, ammonium- and amine salts in general soluble in water.

3. Azo compounds of the general formula:

$$R^1-N=N-R^2$$

wherein $R^1$ stands for a cyclic radical selected from the group consisting of phenyl radicals containing a sulfamide group in the para-position to the azo group and of disulfamide substituted phenyl radicals and of the corresponding N-lower hydrocarbon alkyl and N-alkylene substituted products, both free valences of the alkylene radical being attached to the nitrogen atom, which radicals are free from other substituents,  and wherein $R^2$ stands for a quinoline radical a nuclear carbon atom of which radical is directly connected with the azo group and which contains at least one further substituent selected from the group consisting of amino, lower hydrocarbon alkylamino and hydroxyl groups and further contains at least on acid radical which is bound to the quinoline radical by a member selected from the group consisting of nuclear carbon atoms, oxygen atoms and amino groups, which azo compounds are in the form of their alkali and alkaline-earth metal-, ammonium- and amine salts in general soluble in water.

4. Azo compounds of the general formula:

$$R^1-N=N-R^2$$

wherein $R^1$ stands for a phenyl radical which contains a sulfamide group in the para-position to the azo group and is free from other substituents, and wherein $R^2$ stands for a quinoline radical a nuclear carbon atom of which radical is directly connected with the azo group and which contains at least one further substituent selected from the group consisting of amino, lower hydrocarbon alkylamino and hydroxyl groups and further contains at least one acid radical which is bound to the quinoline radical by a member selected from the group consisting of nuclear carbon atoms, oxygen atoms and amino groups, 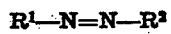 which azo compounds are in the form of their alkali- and alkaline- earth metal-, ammonium- and amine salts in general soluble in water.

5. Azo compounds of the general formula:

wherein $R^1$ stands for a phenyl radical which contains a sulfamide group in the para-position to the azo group and is free from other substituents, and $R^2$ stands for a quinoline radical substituted by a hydroxyl group and at least one sulfo group, a nuclear carbon atom of which radical is directly connected with the azo group and which azo compounds are in the form of their alkali-and alkaline-earth metal-, ammonium and amine salts in general soluble in water.

6. Azo compounds of the general formula:

wherein $R^1$ stands for a cyclic radical selected from the group consisting of phenyl radicals containing a sulfamide group in the para-position to the azo group and of disulfamide substituted phenyl radicals which radicals are free from other substituents, and $R^2$ stands for a pyridine radical a nuclear carbon atom of which radical is directly connected with the azo group and which contains at least one further substituent selected from the group consisting of amino, lower hydrocarbon alkyl-amino and hydroxyl groups and further contains at least one acid radical which is bound to the pyridine radical by a member selected from the group consisting of nuclear carbon atoms, oxygen atoms and amino groups, which azo compounds are in the form of their alkali- and alkaline-earth metal-, ammonium and amine salts in general soluble in water.

7. Azo compounds of the general formula:

wherein $R^1$ stands for a cyclic radical selected from the group consisting of phenyl radicals containing a sulfamide group in the para-position to the azo group and of disulfamide substituted phenyl radicals which are free from other substituents, and $R^2$ stands for an aminopyridine radical which radical is substituted by at least one acid radical, a nuclear carbon atom of which radical is directly connected with the azo group and which azo compounds are in the form of their alkali- and alkaline-earth metal-, ammonium and amine salts in general soluble in water.

8. The azo compound of the formula:

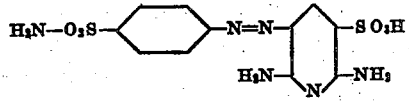

9. The azo compound of the formula:

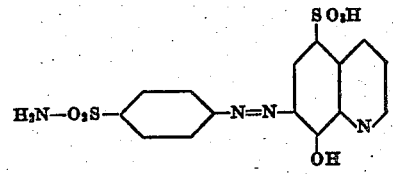

10. The azo compound of the formula:

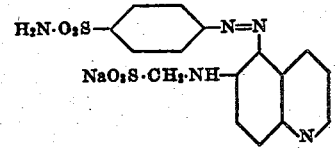

FRITZ MIETZSCH.
JOSEF KLARER.